United States Patent [19]

Moran

[11] 3,741,067

[45] June 26, 1973

[54] FASTENING ASSEMBLY
[75] Inventor: Thomas M. Moran, Cleveland, Ohio
[73] Assignee: Eaton Corporation, Cleveland, Ohio
[22] Filed: May 27, 1971
[21] Appl. No.: 147,571

[52] U.S. Cl................. 85/72, 85/32 V, 85/DIG. 2, 85/80, 85/1, 85/9, 151/41.75
[51] Int. Cl............................................ F16b 37/10
[58] Field of Search..................... 85/DIG. 2, 80, 72, 85/32, 33, 3 R, 3 K; 151/41.75, 22; 18/42 R; 249/59, 66 C; 426/436 PM

[56] References Cited
UNITED STATES PATENTS

| 3,074,134 | 1/1963 | Buechler | 85/72 |
|---|---|---|---|
| 2,352,540 | 6/1944 | Hanneman | 151/22 |
| 3,054,145 | 9/1962 | Helpa | 85/DIG. 2 |
| 3,164,418 | 1/1965 | Biesecker | 85/81 |
| 3,505,921 | 4/1970 | Wigam | 85/72 |
| 3,574,899 | 4/1971 | Fisher | 85/80 |
| 3,588,792 | 6/1971 | Kindell | 151/69 |

FOREIGN PATENTS OR APPLICATIONS 1,083,032  9/1967  Great Britain.................. 151/41.75

Primary Examiner—Edward C. Allen
Attorney—Teagno & Toddy

[57] ABSTRACT

A fastener assembly for mounting with an apertured support panel comprising a pair of complementary nut sections attached to an end portion of an adjustment screw. The nut sections being folded about said screw in a confronting face-to-face relationship with each nut section having an arcuately concave threaded section for engagement with the threads of the screw when said members are in face-to-face relationship. The nut includes deflectable shank elements adapted for locking the fastener assembly in the support panel.

7 Claims, 8 Drawing Figures

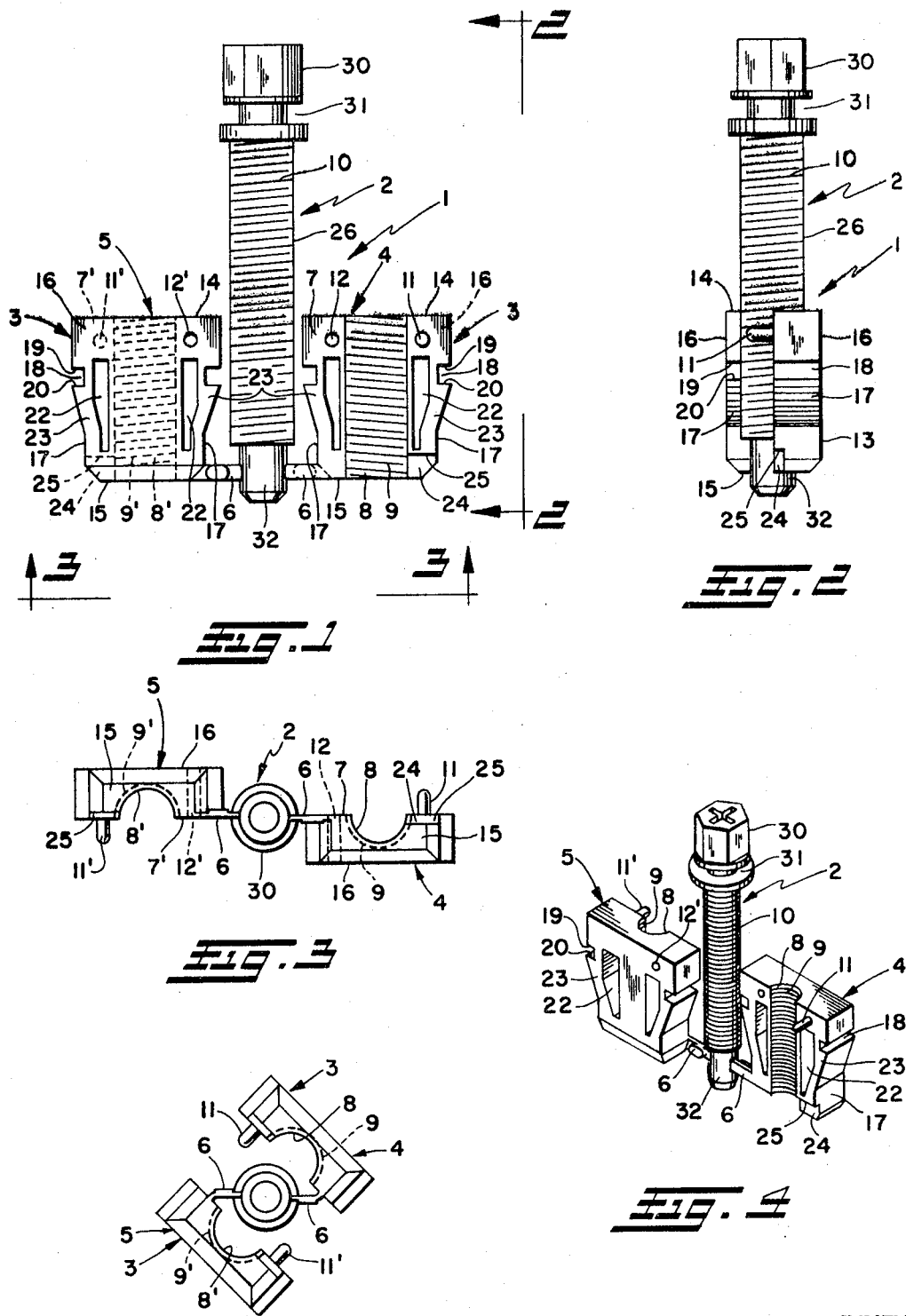
INVENTOR.
THOMAS M. MORAN

Patented June 26, 1973

INVENTOR.
THOMAS M. MORAN
BY Teagno & Taddy
ATTORNEYS

FASTENING ASSEMBLY

BACKGROUND OF THE INVENTION

This invention relates generally to fastening devices, and more particularly to a fastening assembly for mounting two panels or more in adjustable spaced relationship such as in vehicle headlamp adjustment mountings.

Heretofore it has been known to provide fasteners of the type which are adapted to receive a threaded member such as a screw for mounting another panel to a support member. In such prior art devices the threaded member was not an integral part of the fastener and consequently required a separate operation to thread the screw into the bore of the fastening device prior to or after assembly of the fastening device to the support member. The prior devices were unthreaded or if threaded a separate threading operation of the fastener was required as well as involving a separate operation for threadably connecting the threaded member to the fastener of fastener assemblies.

SUMMARY

The present invention provides an improved inexpensive one-piece plastic fastener assembly including a plug-type fastener member and a threaded member for mounting two or more panels in spaced relationship.

A pair of complementary nut halves comprise the plug-type fastener member, each nut half having a pair of transverse slots forming flexible shank sections to facilitate initial insertion of the fastener member in the support member aperture.

The nut halves are connected to the threaded member intermediate the tip and threaded portion by oppositely disposed rupturable web members. The nut halves are foldable about the threaded member in a clockwise direction to enfold the threaded member therebetween.

Each nut half is formed with a semi-cylindrical threaded central recess and with a dowel pin on one side of this recess and a corresponding hole on the other side. Each of the dowel pins cooperating with the hole of the other member to hold and align the nut halves when they are brought together, thus forming a continuous uninterrupted thread for engagement with the threaded member and also for maintaining the nut halves about the threaded member.

The threaded member has helically wound threads of constant crest diameter. An upper portion of the threaded member has a root diameter which is larger than the root diameter of the lower portion of the threaded member. As the threaded member is turned into the fastener device the nut halves are caused to expand outwardly because the threaded member has a larger root diameter. The fastening device being constrained from excessive separation by the walls of the support member aperture, thereby binds the threaded member thus preventing any retrograde rotation of the threaded member due to vibratory forces imparted to the fastening assembly during normal usage.

An object of this invention is to provide an improved fastener assembly.

Another object is to provide an improved one piece molded fastener assembly.

A further object is to provide an improved and inexpensively produced one piece fastener assembly.

Still another object of this invention is to provide a fastener assembly having a threaded screw type member and two complimentary nut halves adapted for folding about the threaded screw member for engagement therewith.

A further object of the invention is to provide a unitary fastener assembly for mounting two or more panels in spaced relationship.

Another object is to provide a unitary fastener assembly having an externally threaded member and two complementary internally threaded nut half segments, each of said segments being connected to the externally threaded member by a flexible and frangible member.

Other objects and advantages of the invention will become apparent from the following detailed description taken in connection with the accompanying drawing.

BRIEF DESCRIPTION OF THE DRAWING

FIG. 1 is a front elevation view of the fastening assembly of the present invention.

FIG. 2 is a side elevation view of the fastening assembly of FIG. 1.

FIG. 3 is a bottom plan view of the fastening assembly of FIG. 1.

FIG. 4 is a perspective view of the fastening assembly of FIG. 1.

FIG. 5 is a bottom plan view of the fastening assembly of FIG. 1 when partly closed.

DESCRIPTION OF THE PREFERRED EMBODIMENTS

Figure 7:
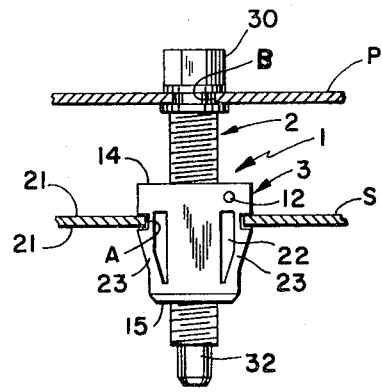
FIG. 7 is a front elevation view, partly in section, of the fastening assembly mounted in a support panel and retaining a second panel.

In FIG. 7 of the drawings, the fastener assembly, generally designated as 1, is mounted with an apertured support member S, such as a panel or the like, for mounting and maintaining another panel, such as P, in adjustable, spaced relation with respect to the support member S. The support member S is provided with an aperture A for receiving the fastener assembly 1. As shown, the fastener assembly 1 comprises a fastener member 3 adapted for insertion in aperture A of the support member S and a threaded member 2 which is threadably engaged with the fastener member 3 for adjustably mounting the panel P in spaced relation with respect to the support member S.

Referring now to FIGS. 1 to 5, the fastener assembly 1 is shown as comprising a one piece device, preferably of a plastic type material. FIGS. 1 to 4 disclose the fastener assembly 1 in its initial molded relationship. The assembly includes threaded member 2 and a fastener member 3 having complementary first and second nut segments 4 and 5 respectively which are integrally joined to the threaded member 2 by a pair of reduced thickness web means 6. These web means 6 are flexible and frangible and permit folding of the first and second nut segments 4 and 5 about the threaded member 2 as shown in FIG. 5.

The first and second nut segments 4 and 5 are formed with complementary faces 7 and 7' respectively so that each face 7 and 7' is aligned on a plane normal to the longitudinal central axis of the threaded member 2 and in opposite direction to each other.

The faces 7 and 7' of each nut segment 4 and 5 are formed with a semi-cylindrical central recess or bore 8 and 8'. Each recess 8 and 8' is threaded at 9 and 9' respectively for engagement with the threads 10 of the threaded member 2. The threads on each face 7 and 7' are interrupted by a planar surface lying in a plane parallel to the axis of the threaded member 2. Nut segments 4 and 5 are identically formed with each segment containing thread portions forming a continuous thread with the other segment when the segments are brought into face to face alignment and for threaded engagement with the threads 10 of member 2.

Integral with the faces 7 and 7' of each nut segment 4 and 5 is a dowel pin 11 which extends outwardly from each face 7 and 7' on one side of the semi-cylindrical recess 8 and 8'. A corresponding hole 12 is formed on the opposite side of recess 8 and 8'. As the two matching nut segments 4 and 5 are swung or folded about the threaded member 2 as indicated in FIG. 5 to form a nut and screw assembly of type illustrated in FIG. 6, each of the dowel pins 11 and 11' enters the hole 12, 12' of the other nut segment 4 and 5. The dowel pins 11 and 11' and the mating holes 12, 12' serve to align the nut segments 4 and 5 so that the interrupted threads 9 and 9' form a continuous helical thread and also function to hold the two nut segments in mated relationship.

Figure 6:
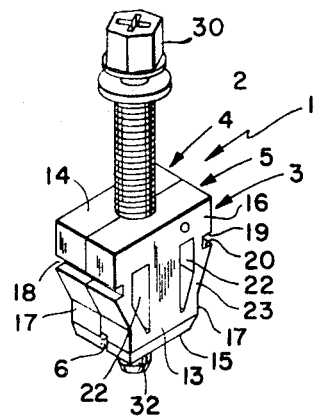
FIG. 6 is a perspective view of the fastener assembly of FIG. 1 when closed.

FIG. 6 illustrates a fastening assembly 1 wherein the complementary nut segments 4 and 5 are in folded position about the threaded member 2 prior to being inserted in a support member S.

Referring again to FIGS. 1 to 4 the nut segments 4 and 5 each includes a rigid shank like body 13 having a head 14 and entering end 15. The body 13 is generally rectangular in transverse cross section being defined by generally parallel side 16 and end walls 17 for insertion within the panel aperture A.

In the form shown, the end walls 17 are each provided with a groove 18 providing transversely extending upper and lower shoulders 19 and 20 respectively for engagement with the opposed faces 21 of the support panel S as shown in FIG. 7.

A transversely longitudinal slot 22 formed in the side walls 16 adjacent to and on each side of the semi-cylindrical recess 8, 8' forms flexible shank ports 23 in body 13. The flexible shank portions 23 yield inwardly to facilitate the initial insertion of the fastener member 3 within the aperture A of the support panel S. For example as the entering end of the fastener member 3 is inserted into the panel aperture A, the flexible shank portions 23 yield inwardly until support panel S is retained in groove 18.

As seen in FIGS. 1 to 3 the faces 7 and 7' of each nut segment 4 and 5 has an elongated recess 24 extending from the central recess 8 and 8' to the end wall 17. The upper wall 25 of recess 24 extends generally parallel to the entering end 15 of the shank like body 13 and opens onto the entering end 15 of the body 13. The recess 24 has a width and depth equal to or greater in size than the web means 6 so that the web means 6 lies within the recess 24 as the nut segments 4 and 5 are folded about the threaded member 2 for a face-to-face abutment of the nut segments 4 and 5.

Figure 8:
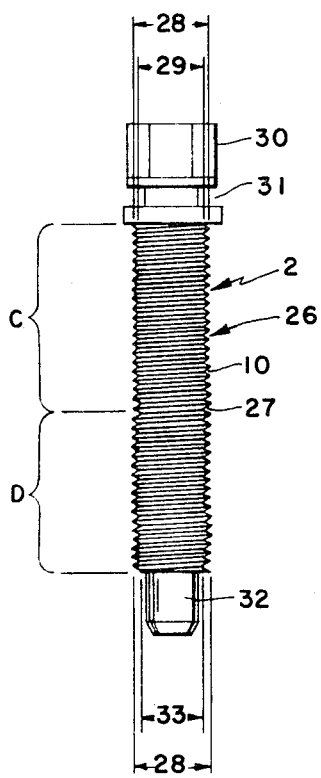
FIG. 8 is an enlarged front elevation view of the screw of FIG. 1 showing the different root diameters.

As shown in FIG. 8 the threaded member 2 includes a shank portion 26 including a head portion 30 and a terminal dog point 32. The shank portion 26 has a threaded portion of helically wound threads 27 of uniform diameter formed thereon and whose thread diameter 28 is equal to that of the threads of the nut segments 4 and 5 to be threadably disposed therein. The dog point 32 is unthreaded and of a transverse dimension equal to or less than that of the adjacent thread root diameter 33.

The shank 26 is further characterized in that the upper portion C of the shank 26 has a thread root diameter 29 which is larger than the thread root diameter 33 of the lower portion D of the shank 26, and the threads of the upper portion C of shank 26 have a root diameter 29 whose transverse dimension is larger than the transverse dimension of the threads of the nut segments 4 and 5. As a result the threads of nut segments 4 and 5 will frictionally engage the root diameter 29 of the threaded member 2 with an interference fit.

After the nut segments 4 and 5 are rotated about the threaded member 2, as indicated in FIG. 5, into an enclosed position as in FIG. 6, the fastener assembly 1 is inserted into a support panel S as indicated in FIG. 7. As the threaded member 2 is rotated in the fastener member 3 the web members are fractured freeing the threaded member 2 from each nut segment 4 and 5 of the fastener member 3 with the web 6 remaining in recess 24. Further rotation of the threaded member 2 into the fastener member 3 results in a separation or expansion of the nut segments 4 and 5 as the threads of the segments 4 and 5 engage the root diameter 27 of the upper portion C of the threaded member 2.

The panel P may be mounted on the head 30 of the threaded member 2 via the annular groove 31, whereupon the selective axial movement of the threaded member 2 will result in a corresponding movement of the panel P.

The foregoing arrangement thus provides a fastening assembly 1 of simple construction for connecting and mounting panels in adjustably spaced relationship. The nut segments 4 and 5 are connected to the threaded member 2 by web members 6 and remains a unitary structure until further rotation of the threaded member 2 into the nut segments 4 and 5 fractures the web members 6, resulting in a freely rotatably threaded member 2. The fastening assembly 1 is firmly locked in a panel aperture and retrograde rotation of the threaded member 2 due to vibration is limited as a result of the binding of the threads on the upper section C of the threaded member 2 with the threads of nut segments 4 and 5. The use of dowel pins 11 and 11' and corresponding mating holes 12 and 12' to align and hold the nut segments 4 and 5 together also assures alignment of groove 18 for abutment with the panel faces of support member S.

Although the present embodiment discloses thread means for engagement between members, other means for interengagement between members may be made without departing from the scope of the invention.

I claim:

1. A molded, one-piece fastener assembly having a first molded position and a second assembled position for mounting in an aperture of a support panel, said fastener assembly comprising:
   in said first molded position;
   an externally-threaded member,
   a first internally-threaded member disposed on one side of said externally-threaded member with the threaded portion thereof disposed in a cavity opening outward in a first direction and extending axially in a direction substantially parallel to said externally-threaded member, a second internally-threaded member disposed on the opposite side of said externally-threaded member with its threaded portion in a cavity opening outward in a second direction opposite to said first direction and extending axially in a direction substantially parallel to said externally-threaded member, a pair of thin frangible web members, said web members extending from opposite sides of said threaded member to said first and second internally-threaded members respectively; and said fastener assembly in its second assembled position having a substantially closed threaded bore defined by said first and second internally-threaded members being in face-to-face relation, said threaded member threadably received in said threaded bore and axially disposed in said threaded bore a predetermined distance.

2. The fastener assembly of claim 1 wherein said externally-threaded member has an unthreaded dog point at its bottom and said web members extend from opposite sides of said dog point to said first and second internally-threaded members.

3. The fastener assembly of claim 2 wherein each internally-threaded member has a recess disposed in its threaded portion side which receives said web members when said fastener is in its second position.

4. The fastener assembly of claim 2 wherein said threaded member has a threaded portion of non-uniform root diameter, said portion extending above and out of contact with said internally-threaded member when said fastener assembly is in its second position.

5. The fastener assembly of claim 2 wherein said first internally-threaded member has an aperture in its threaded segment side disposed a predetermined distance from said externally-threaded member and said second internally-threaded member has a dowel-like portion protruding from its threaded segment side at said predetermined distance from said externally-threaded member when said fastener assembly is in its first position, said dowel received within said aperture when said fastener assembly is in its second position.

6. A molded, one-piece fastener assembly for mounting in an aperture of a support panel to maintain a second, slotted panel at a predetermined distance from the support panel and having a first molded position and a second assembled position, said fastener assembly comprising:

in said first molded position;
an externally threaded member having a portion of its head end unthreaded, a first internally-threaded, half-nut member disposed on one side of said externally-threaded member with the threaded portion thereof disposed axially parallel to said externally-threaded member and opening outward in a first direction, a second internally-threaded, half-nut member disposed on the opposite side of said externally-threaded member with its threaded portion axially parallel to said externally-threaded member and opening outward in a second direction opposite said first direction, a pair of thin frangible web members, said web member extending from opposite sides of said threaded member to said first and second internally-threaded members respectively; and said fastener assembly in its second assembled position having a substantially closed threaded bore defined by said first and second internally-threaded members being in face-to-face relation and disposed in the aperture of said support member, said threaded member threadably received in said threaded bore and axially disposed therein a predetermined distance, said unthreaded portion of said externally-threaded member engaging a slot in said second panel.

7. The molded fastener assembly of claim 6, wherein said unthreaded portion of said externally-threaded member has a flat washer surface at each end thereof, said washer surfaces greater than the width of said engaging slots in said second panel.

* * * * *